United States Patent
Misawa et al.

(10) Patent No.: US 10,936,901 B2
(45) Date of Patent: Mar. 2, 2021

(54) INFORMATION PROCESSING DEVICE AND NON-TRANSITORY COMPUTER READABLE RECORDING MEDIUM

(71) Applicant: FUJI XEROX CO., LTD., Tokyo (JP)

(72) Inventors: Shotaro Misawa, Kanagawa (JP); Motoki Taniguchi, Kanagawa (JP); Yasuhide Miura, Kanagawa (JP); Tomoko Okuma, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 60 days.

(21) Appl. No.: 16/120,315

(22) Filed: Sep. 3, 2018

(65) Prior Publication Data
US 2019/0272444 A1  Sep. 5, 2019

(30) Foreign Application Priority Data
Mar. 2, 2018 (JP) .............................. JP2018-037558

(51) Int. Cl.
*G06K 9/62* (2006.01)
*G06K 9/00* (2006.01)

(52) U.S. Cl.
CPC ....... *G06K 9/6215* (2013.01); *G06K 9/00469* (2013.01); *G06K 2209/01* (2013.01)

(58) Field of Classification Search
CPC ..................... G06F 16/90344; G06K 2209/01

USPC ......... 358/474; 382/167, 189; 718/780, 226, 718/22; 714/47.2, 47.1
See application file for complete search history.

(56) References Cited

U.S. PATENT DOCUMENTS

| | | | | |
|---|---|---|---|---|
| 2013/0151957 A1* | 6/2013 | Kuroiwa | ............... | G06F 40/268 715/256 |
| 2014/0118787 A1* | 5/2014 | Tennichi | .................. | B41J 29/00 358/1.15 |
| 2016/0283786 A1* | 9/2016 | Imoto | ................ | G06K 9/00409 |
| 2017/0242782 A1* | 8/2017 | Yoshida | ............. | G06F 11/3692 |
| 2018/0096062 A1* | 4/2018 | Lorge | .................... | G06F 16/367 |

FOREIGN PATENT DOCUMENTS

| JP | 2009-223548 | 10/2009 |
|---|---|---|
| JP | 2017-211784 | 11/2017 |

* cited by examiner

*Primary Examiner* — Kiet M Doan
(74) *Attorney, Agent, or Firm* — JCIPRNET

(57) ABSTRACT

An information processing device includes a computation unit that computes a similarity between character strings among plural character strings which express a content of electronic information and which are generated from the electronic information, and an association unit that associates a dissimilar character string that is not similar to another character string among the plural character strings with the electronic information as a representative character string that expresses the electronic information.

16 Claims, 8 Drawing Sheets

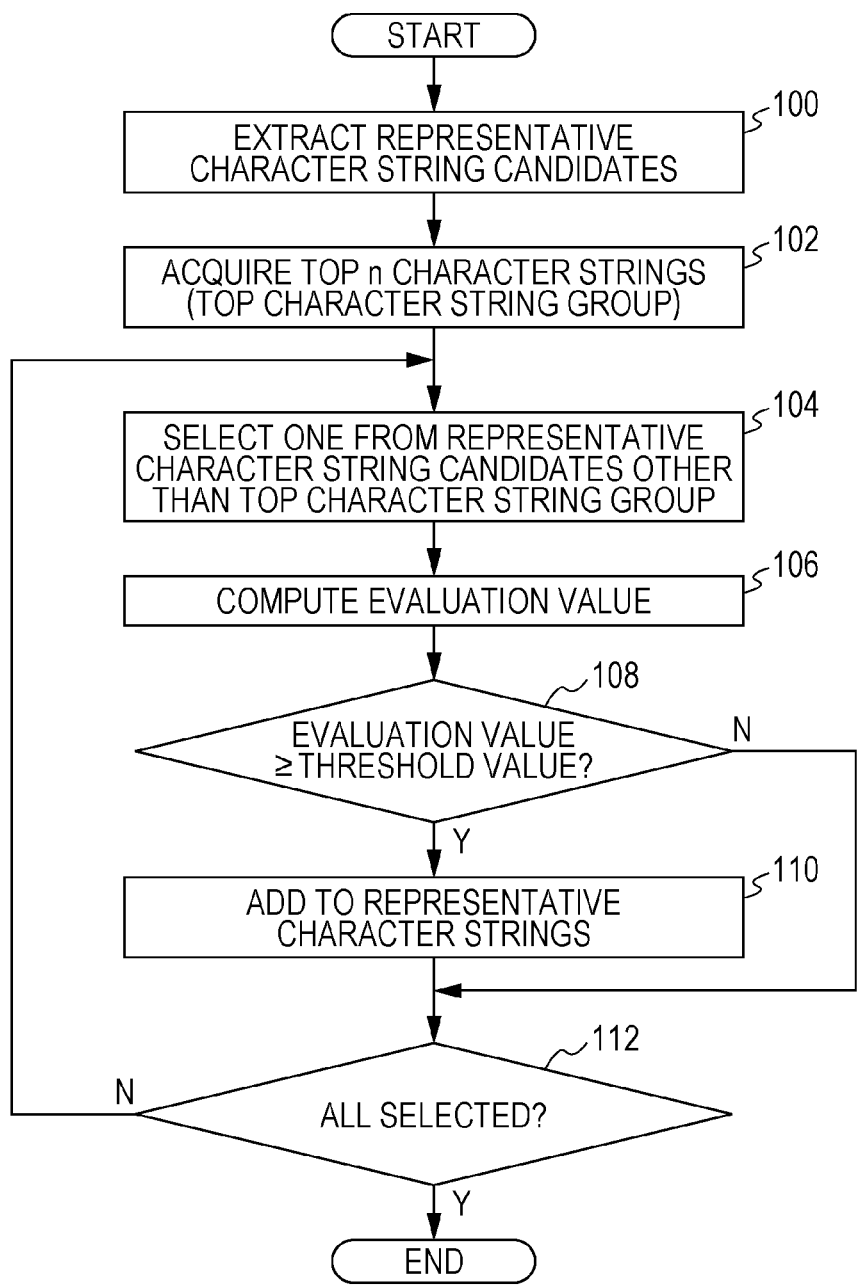

ated expression by machine translation, in which, after acquiring translation candidates of multiple words, the technology decides a translated expression such that the acquired multiple words are consistent with each other.

INFORMATION PROCESSING DEVICE AND NON-TRANSITORY COMPUTER READABLE RECORDING MEDIUM

CROSS-REFERENCE TO RELATED APPLICATIONS

This application is based on and claims priority under 35 USC 119 from Japanese Patent Application No. 2018-037558 filed Mar. 2, 2018.

BACKGROUND

(i) Technical Field

The present disclosure relates to an information processing device and a non-transitory computer readable recording medium.

(ii) Related Art

Japanese Unexamined Patent Application Publication No. 2009-223548 describes a technology related to the acquisition of a translated expression by machine translation, in which, after acquiring translation candidates of multiple words, the technology decides a translated expression such that the acquired multiple words are consistent with each other.

Japanese Unexamined Patent Application Publication No. 2017-211784 describes a technology that extracts a summary from a candidate set of summaries extracted randomly from a document, using state transitions of entities in summary groups included in each set and the completeness of important information as criteria.

SUMMARY

Aspects of non-limiting embodiments of the present disclosure relate to providing an information processing device and a recording medium in which, in the case of assigning to electronic information representative character strings expressing the electronic information, it is possible to avoid applying character strings having similar meanings to the electronic information compared to the case of not considering the similarity between multiple character strings generated from the electronic information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a computation unit that computes a similarity between character strings among a plurality of character strings which express a content of electronic information and which are generated from the electronic information, and an association unit that associates a dissimilar character string that is not similar to another character string among the plurality of character strings with the electronic information as a representative character string that expresses the electronic information.

BRIEF DESCRIPTION OF THE DRAWINGS

Exemplary embodiments of the present disclosure will be described in detail based on the following figures, wherein:

FIG. 4 is a flowchart illustrating an example of the flow of information processing executed by the information processing device according to the first exemplary embodiment;

DETAILED DESCRIPTION

Hereinafter, exemplary embodiments for carrying out the present disclosure will be described in detail and with reference to the drawings.

First Exemplary Embodiment

The information processing device according to the present exemplary embodiment selects representative character strings expressing the content of electronic information from multiple character strings generated from the electronic information, and associates the selected representative character strings with the electronic information. Hereinafter, the information processing device according to the present exemplary embodiment will be described in detail.

Figure 1:
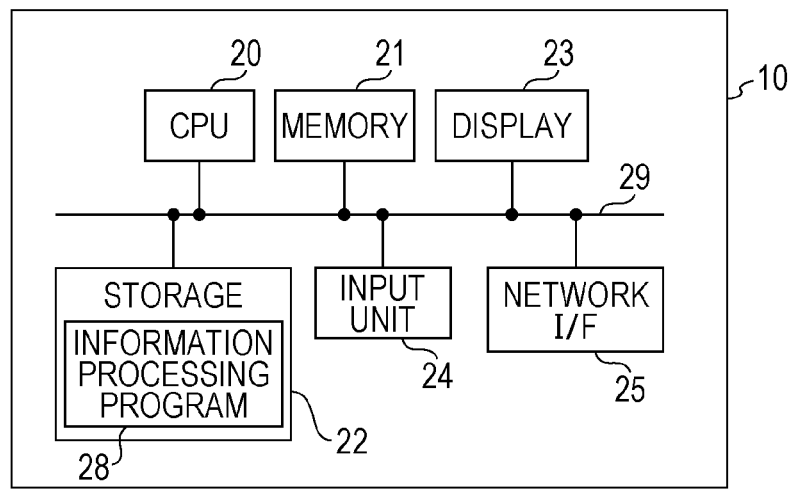
FIG. 1 is a block diagram illustrating an example of a hardware configuration of the information processing device according to a first exemplary embodiment.

First, FIG. 1 will be referenced to describe a hardware configuration of the information processing device 10 according to the present exemplary embodiment. As illustrated in FIG. 1, the information processing device 10 includes a central processing unit (CPU) 20, memory 21 that acts as a temporary storage area, and non-volatile storage 22. The information processing device 10 also includes a display 23 such as a liquid crystal display, an input unit 24 such as a keyboard and mouse, and a network interface (I/F) 25 connected to a network (not illustrated). The CPU 20, the memory 21, the storage 22, the display 23, the input unit 24, and the network I/F 25 are connected to a bus 29.

The storage 22 is realized by a hard disk drive (HDD), a solid-state drive (SSD), flash memory, or the like. In the storage 22 that acts as a storage medium, an information processing program 28 is stored. The CPU 20 reads out and loads the information processing program 28 from the storage 22 into the memory 21, and executes the loaded information processing program 28.

Figure 2:
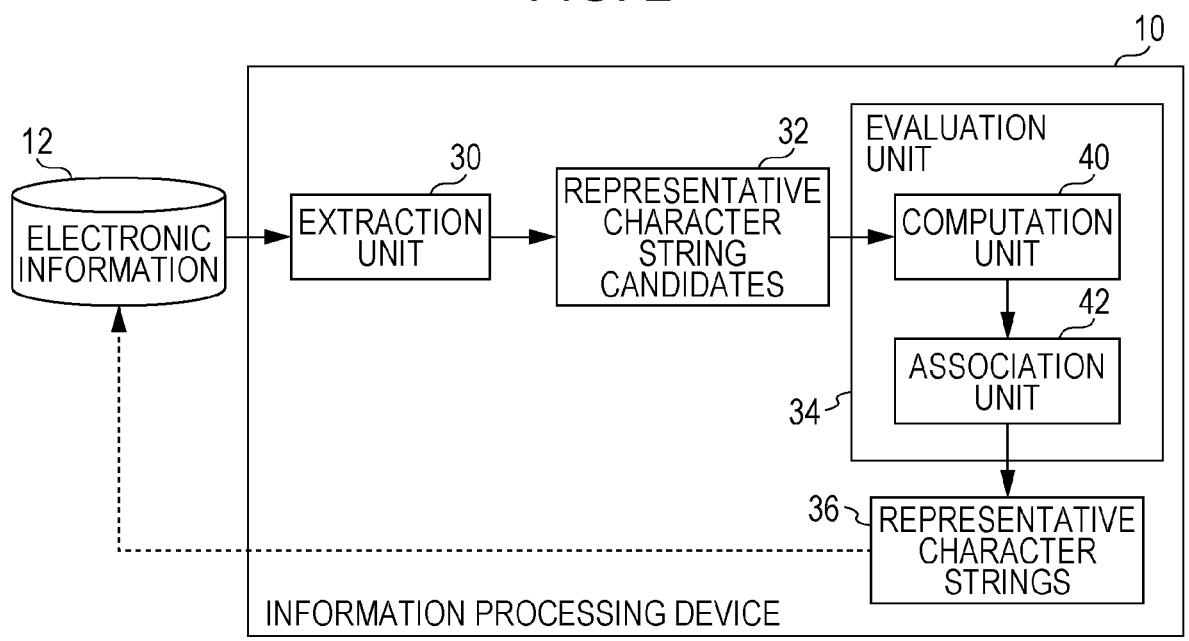
FIG. 2 is a block diagram illustrating an example of a functional configuration of the information processing device according to the first exemplary embodiment.

Next, FIG. 2 will be referenced to describe a functional configuration of the information processing device 10 according to the present exemplary embodiment. As illustrated in FIG. 2, the information processing device 10 includes an extraction unit 30 and an evaluation unit 34. Additionally, the evaluation unit 34 includes a computation unit 40 and an association unit 42. By executing the information processing program 28, the CPU 20 functions as the extraction unit 30 as well as the computation unit 40 and the association unit 42 of the evaluation unit 34.

The extraction unit 30 extracts representative character string candidates 32 from electronic information 12 by generating character strings expressing the content of the electronic information 12. In the present exemplary embodiment, as one example, a case will be described in which the electronic information 12 is electronic data expressing sentences that include multiple words, and the representative character string candidates 32 are character strings that act as key phrases (character strings that include one or multiple words). Note that the electronic information 12 of the present exemplary embodiment is not particularly limited, and may be a document including multiple sentences or scenes, and furthermore may be multiple documents.

Figure 3A:
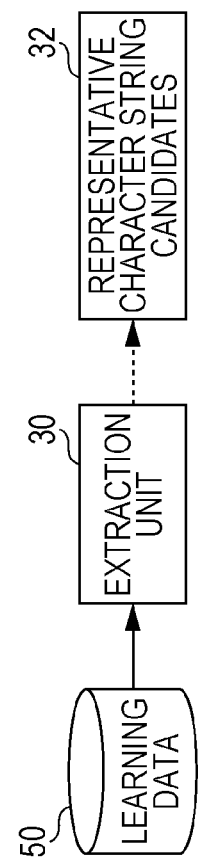
FIG. 3A is a diagram for explaining machine learning of a model applied to an extraction unit of the information processing device according to the first exemplary embodiment.

In the present exemplary embodiment, as illustrated in FIG. 3A as an example, the extraction unit 30 uses multiple pieces of electronic information 12 as learning data 50 to execute machine learning of a model of an encoder-decoder type neural network, such that representative character string candidates 32 are extracted from the electronic information 12. Subsequently, the extraction unit 30 of the present exemplary embodiment applies the learned model to extract multiple character strings from the electronic information 12 as the representative character string candidates 32. Note that the technology that uses the learning data 50 to generate, by machine learning, a model that extracts character strings expressing the content of the electronic information 12 from the electronic information 12 is not particularly limited to the above example, and existing technology may be applied.

As described above, the evaluation unit 34 includes the computation unit 40 and the association unit 42. The computation unit 40 computes the similarity between character strings in the representative character string candidates 32. Note that in the present exemplary embodiment, the similarity computed by the computation unit 40 is called the "evaluation value". The association unit 42 selects character strings (dissimilar character strings) that are not similar to other character strings among the representative character string candidates 32 on the basis of the evaluation value, and associates the dissimilar character strings with the electronic information 12 as representative character strings 36 that express the electronic information 12.

Figure 3B:
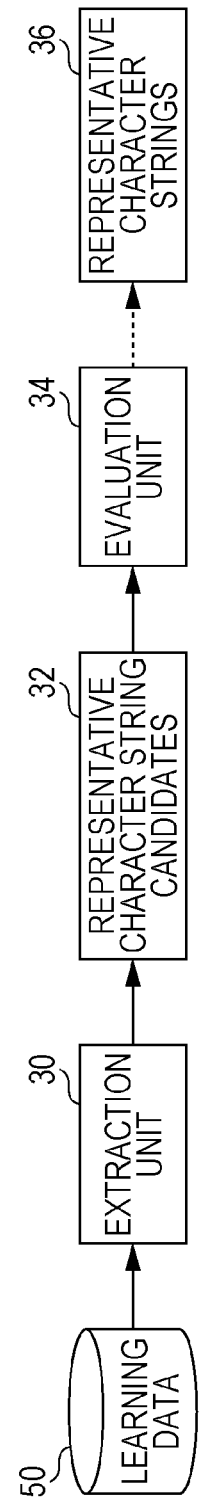
FIG. 3B is a diagram for explaining machine learning of a model applied to an evaluation unit of the information processing device according to the first exemplary embodiment.

In the present exemplary embodiment, as illustrated in FIG. 3B as an example, the evaluation unit 34 uses, as learning data, the representative character string candidates 32 extracted by the extraction unit 30 including the model learned using the learning data 50 as described above with reference to FIG. 3A.

Subsequently, from the learning data, that is, the representative character string candidates 32, the computation unit 40 computes the evaluation values of the character strings, and executes machine learning of a model of a neural network using bidirectional long short-term memory (Bi-LSTM), such that character strings selected according to similarity by the association unit 42 are associated with the electronic information 12. Subsequently, the computation unit 40 of the evaluation unit 34 according to the present exemplary embodiment applies the learned model to compute the evaluation value between multiple character strings from the representative character string candidates 32. Subsequently, on the basis of the evaluation values computed by the computation unit 40, the association unit 42 selects character strings from the representative character string candidates 32, and associates the selected character strings with the electronic information 12 as the representative character strings 36.

The technology that uses the representative character string candidates 32 as learning data to generate, by machine learning, a model that derives an evaluation value of a character string included in the representative character string candidates 32 is not particularly limited to the above example, and existing technology may be applied. Note that a specific method of computing an evaluation value by the computation unit 40 and a specific method of associating the representative character strings 36 with the electronic information 12 by the association unit 42 according to the exemplary embodiment will be described later.

Next, the operation of the information processing device 10 according to the present exemplary embodiment will be described. By having the CPU 20 execute the information processing program 28, the information processing illustrated in FIG. 4 is executed. Also, the information processing illustrated in FIG. 4 is executed in the case in which an instruction to execute the information processing program 28 is input by the user through the input unit 24, for example.

Figure 5:
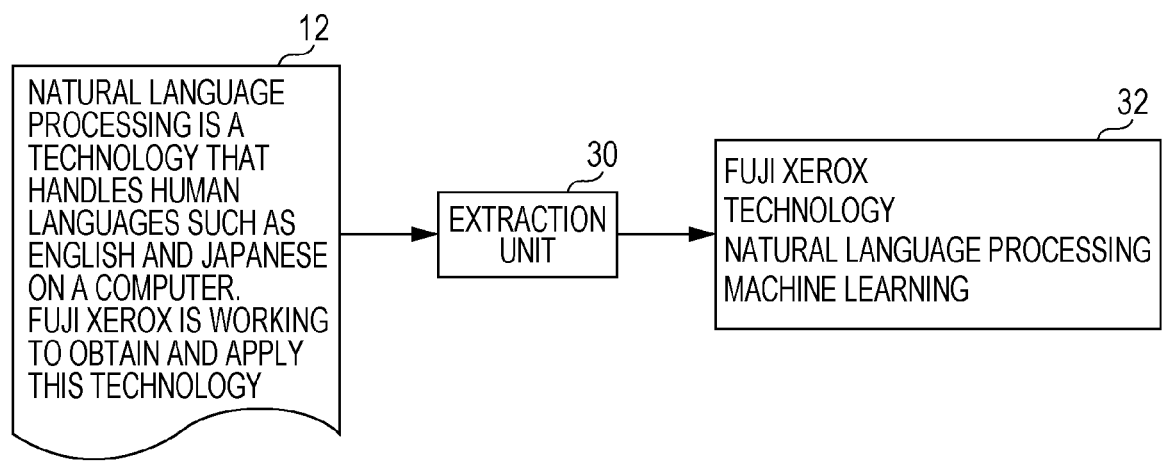
FIG. 5 is a diagram illustrating an example of electronic information and representative character string candidates extracted from the electronic information.

In step S100 of FIG. 4, as described above, the extraction unit 30 extracts multiple character strings from the electronic information 12 as representative character string candidates 32. As a specific example of the electronic information 12, FIG. 5 illustrates information expressing a document including the following sentences: "Natural language processing is a technology that handles human languages such as English and Japanese on a computer. Fuji Xerox is working to obtain and apply this technology". Hereinafter, the electronic information 12 illustrated in FIG. 5 will be described as a specific example.

As illustrated in FIG. 5, the extraction unit 30 extracts the four character strings "Fuji Xerox", "technology", "natural language processing", and "machine learning" from the electronic information 12 as representative character string candidates 32. Note that, as is understood by comparing the electronic information 12 and the representative character string candidates 32 illustrated in FIG. 5, the character string "machine learning" itself is not included in the electronic information 12. In this way, the extraction unit 30 is not limited to the character strings themselves included in the electronic information 12, and extracts representative character string candidates 32 by generating character strings expressing the content of the electronic information 12.

Figure 6:
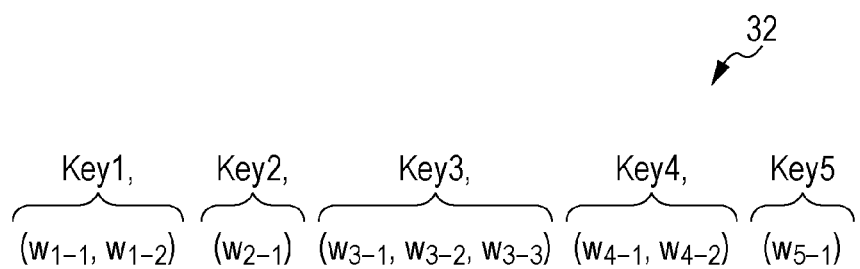
FIG. 6 is a diagram for explaining an example of a posterior probability ranking when generating multiple character strings from electronic information by the extraction unit of the information processing device according to the first exemplary embodiment.

In the next step S102, in a ranking of the posterior probabilities from the process of generating character strings from the electronic information 12, the computation unit 40 acquires the top n (where n is a predetermined arbitrary integer) character strings (hereinafter called the "top character string group") from among the multiple character strings included in the representative character string candidates 32. For example, as illustrated in FIG. 6, in the case in which the extraction unit 30 generates five character strings (Key1 to Key5) in the above step S100, and n=3, the computation unit 40 acquires three character strings (Key1 to Key3) as the top character string group. Note that in the example illustrated in FIG. 6, "Keyk" indicates the character string ranked kth by posterior probability. Also, "$w_{k-i}$" in FIG. 6 indicates the ith word of the character string ranked kth by posterior probability. The posterior probability ranking in the present exemplary embodiment is one example of certainty according to the present disclosure.

In other words, as one example, FIG. 6 illustrates a case in which the character string Key1 ranked 1st by posterior probability includes two words $w_{1-1}$ and $w_{1-2}$, the character string Key2 ranked 2nd by posterior probability includes one word $w_{2-1}$, the character string Key3 ranked 3rd by posterior probability includes three words $w_{3-1}$, $w_{3-2}$, and $w_{3-3}$, the character string Key4 ranked 4th by posterior probability includes two word $w_{4-1}$ and $w_{1-2}$, and the character string Key5 ranked 5th by posterior probability includes one word $w_{5-1}$.

Note that in the present exemplary embodiment, the association unit 42 includes the top character string group in the representative character strings 36, irrespective of the similarity between the character strings included in the top character string group.

In the next step S104, the computation unit 40 selects one character string from the character strings other than the top character string group among the character strings included in the representative character string candidates 32. As one example, the computation unit 40 of the present exemplary embodiment selects one character string in order of highest posterior probability from among the character strings other than the top character string group. For example, after the start of this information processing, in the case of executing step S104 for the first time, the computation unit 40 selects the character string Key4.

Figure 7:
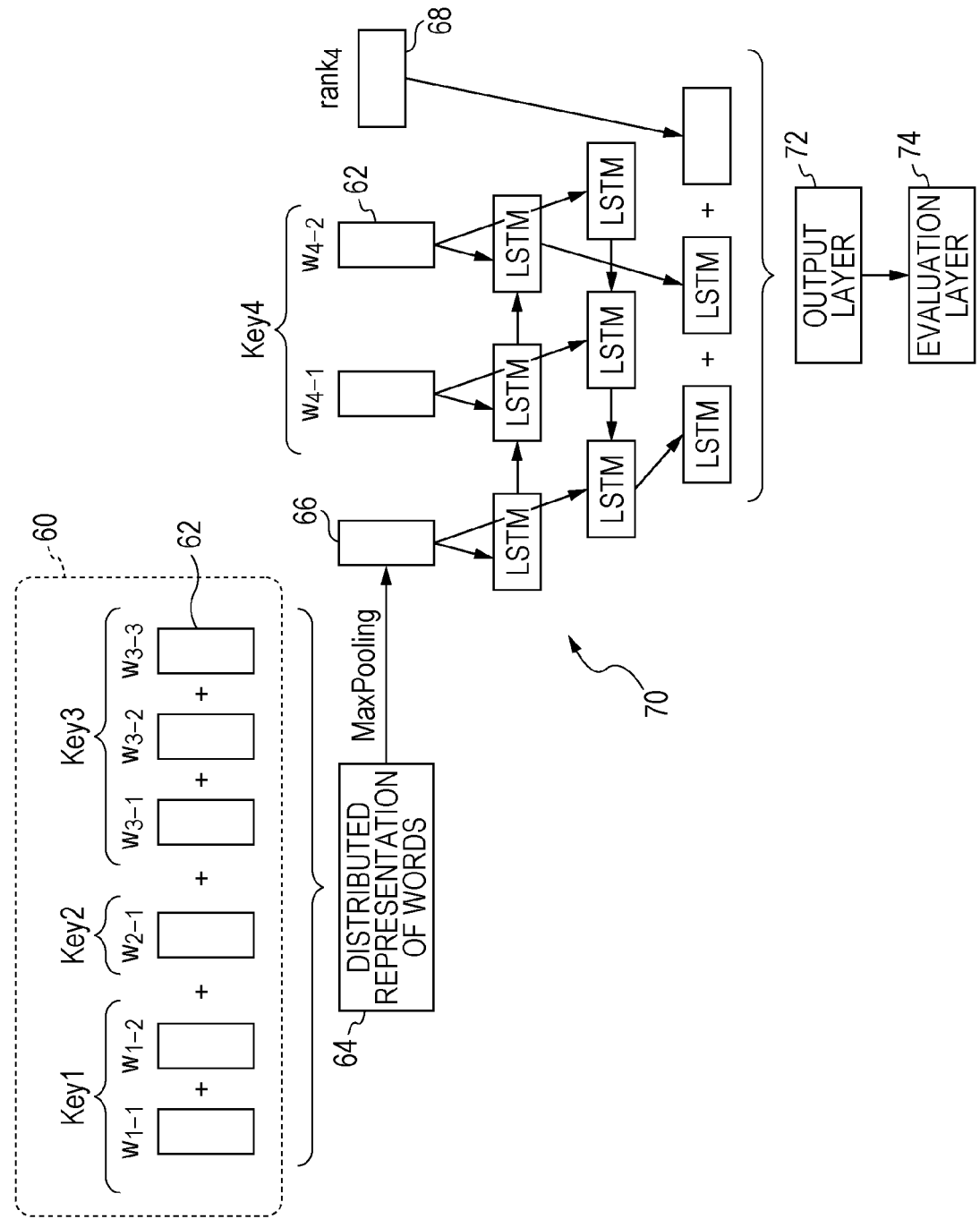
FIG. 7 is a diagram for explaining an example of a method of computing an evaluation value by the evaluation unit of the information processing device according to the first exemplary embodiment.

In the next step S106, the computation unit 40 computes the evaluation value of the character string selected in the above step S104. One example of a method of computing the evaluation value in the computation unit 40 will be described with reference to FIG. 7. Note that, as one example, FIG. 7 illustrates a case in which the computation unit 40 has selected the character string Key4 in the above step S104.

First, the computation unit 40 combines distributed representations 62 corresponding to each word to $w_{3-3}$) of the top character string group 60 including the character strings Key1 to Key3 described above, and derives a distributed representation of words 64.

Furthermore, the computation unit 40 inputs a distributed representation 66 obtained by MaxPooling the combined distributed representation of words 64, a distributed representation 62 of each word ($w_{4-1}$ to $w_{4-2}$) of the character string Key4, and a rank distributed representation 68, which is a distributed representation corresponding to the posterior probability ranking (rank4) of the character string Key4, into the input layer of a learned Bi-LSTM model 70. Additionally, the computation unit 40 computes the evaluation value 74 corresponding to the output layer 72 of the Bi-LSTM model 70.

Note that the evaluation value 74 of the present exemplary embodiment becomes a large value to the extent that the character string selected in the above step S104 (in FIG. 7, the character string Key4) and the top character string group 60 are not similar to each other (to the extent that the character strings are dissimilar). In other words, the evaluation value 74 becomes a small value to the extent that the character string selected in the above step S104 and the top character string group 60 are similar to each other (to the extent that the character strings are not dissimilar). Also, the evaluation value 74 becomes a large value to the extent that the character string selected in the above step S104 (in FIG. 7, the character string Key4) is ranked high by posterior probability. In other words, the evaluation value 74 becomes a small value to the extent that the character string selected in the above step S104 is ranked low by posterior probability.

In the next step S108, the association unit 42 determines whether or not the evaluation value 74 computed in the above step S106 is a predetermined threshold value or greater.

In the case in which the evaluation value 74 is not the threshold value or greater, or in other words, in the case in which the evaluation value 74 is less than the threshold value, the determination of step S108 becomes a negative determination, and the flow proceeds to step S112. On the other hand, in the case in which the evaluation value 74 is the threshold value or greater, the determination of step S108 becomes a positive determination, and the flow proceeds to step S110.

In step S110, the association unit 42 adds the character string selected in the above step S104 (in FIG. 7, the character string Key4) to the representative character strings 36.

In the next step S112, the association unit 42 determines whether or not all character strings other than the top character string group included in the representative character string candidates 32 have been selected in the above step S104. In the case in which there is a character string that the computation unit 40 has not selected yet, the determination of step S112 becomes a negative determination, the flow returns to step S104, and the process from step S106 to S110 is repeated. On the other hand, in the case in which the computation unit 40 has selected all character strings other than the top character string group included in the representative character string candidates 32, the determination of step S112 becomes a positive determination, and the information processing ends.

Note that the present exemplary embodiment describes a configuration in which, in the above information processing, the top character string group is taken to be the top n character strings ranked by posterior probability acquired by the computation unit 40 in the step S102, and the representative character strings 36 are taken to be the top character string group and also character strings which are not similar to the top character string group. However, for example, the top character string group is not limited to such a configuration.

For example, a configuration may also be taken in which the computation unit 40 computes the similarity between character strings included in the top character string group acquired in step S102 of the above information processing, and in the case in which mutually similar character strings are included, the similar character strings are excluded from the top character string group. In this case, it is sufficient to leave a predetermined number of character strings (preferably 1) from among the mutually similar character strings in the top character string group, and exclude the other character strings from the top character string group.

Note that in the case of excluding character strings included in the top character string group in this way, it is preferable to add to the top character string group character strings selected from the character strings other than the current top character string group from among the representative character string candidates 32. Note that at this time, it is preferable to add to the top character string group the same number of character strings as the character strings which have been excluded from the top character string group.

Also, when excluding character strings included in the top character string group in this way, it is preferable to reassign the posterior probabilities (or the posterior probability ranks) lower than the posterior probabilities (or the posterior probability ranks) of the character strings other than the current top character string group from among the representative character string candidates 32. By reassigning the posterior probabilities (or the posterior probability ranks) in this way, the selection of an excluded character string to the representative character strings 36 is reduced, and thus the inclusion of similar character strings in the representative character strings 36 may be reduced.

Second Exemplary Embodiment

Hereinafter, an exemplary embodiment will be described in detail and with reference to the drawings. Note that configuration elements and operations which are similar to the first exemplary embodiment above will be noted, and a detailed description will be reduced or omitted.

Since the configuration of the information processing device 10 of the present exemplary embodiment is similar to the configuration of the information processing device 10 of the first exemplary embodiment (see FIGS. 1 and 2), a description will be omitted.

Figure 8:
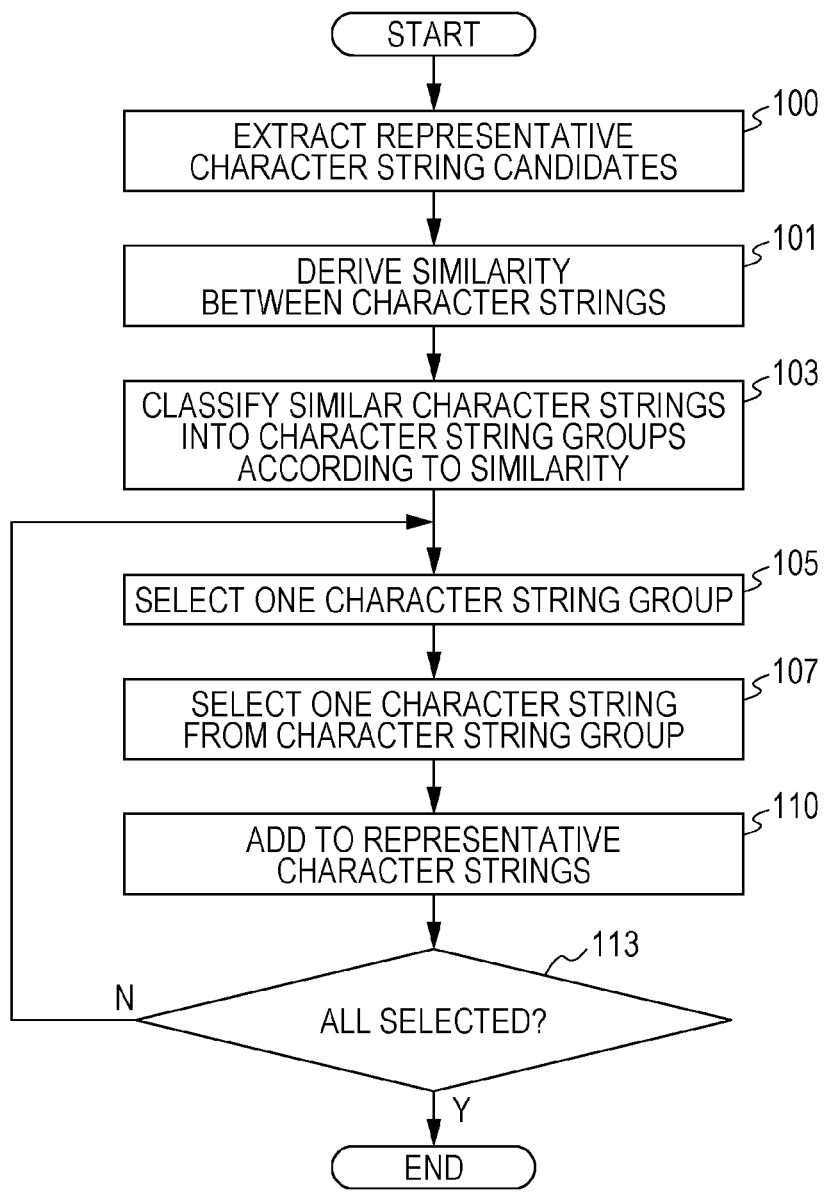
FIG. 8 is a flowchart illustrating an example of the flow of information processing executed by the information processing device according to a second exemplary embodiment.

In the information processing device 10 of the present exemplary embodiment, since the operations of the computation unit 40 and the association unit 42 of the evaluation unit 34 are different from the operations of the computation unit 40 and the association unit 42 of the first exemplary embodiment, the operations of the information processing device 10 of the present exemplary embodiment will be described. By having the CPU 20 execute the information processing program 28, the information processing illustrated in FIG. 8 is executed. Also, the information processing illustrated in FIG. 8 is executed in the case in which an instruction to execute the information processing program 28 is input by the user through the input unit 24, for example.

As illustrated in FIG. 8, the information processing of the present exemplary embodiment differs by executing the process from step S101 to S107 instead of step S102 to S108, and by executing step S113 instead of step S112 of the information processing of the first exemplary embodiment (see FIG. 4).

In step S101, the computation unit 40 derives the similarity between character strings included in the representative character string candidates 32. Note that in the present exemplary embodiment, similarity is information indicating whether character strings are similar to each other, with a higher similarity indicating that the character strings are more similar to each other. In other words, a lower similarity indicates that the character strings are not similar to each other (dissimilar).

Figure 9:
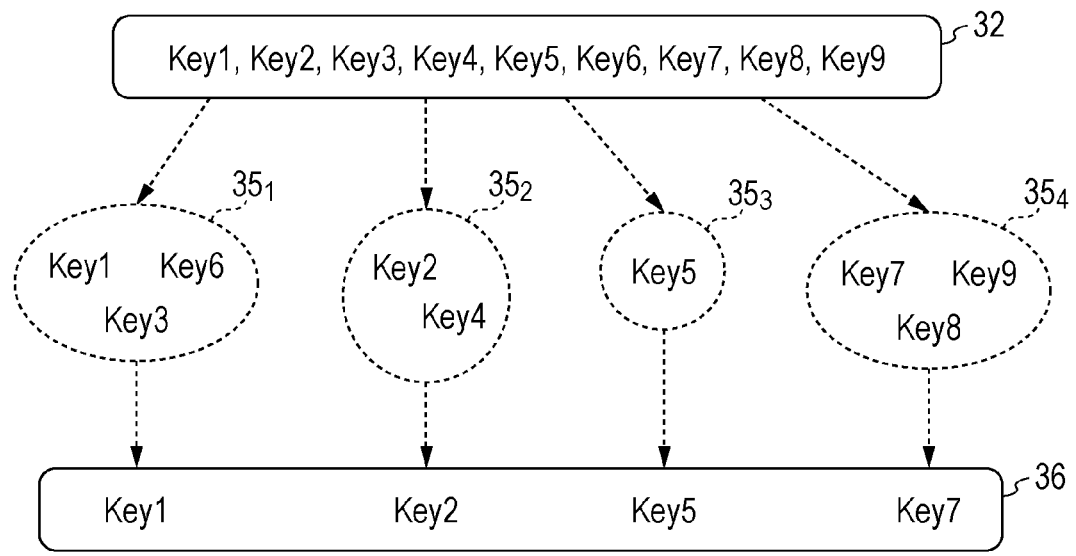
FIG. 9 is a diagram for explaining an example of a method of selecting a representative character string by the evaluation unit of the information processing device according to the second exemplary embodiment.

Next, in step S103, on the basis of the similarity derived in the above step S101, the association unit 42 classifies the character strings included in the representative character string candidates 32 into character string groups 35 that include mutually similar character strings, as illustrated in FIG. 9. As one example, FIG. 9 illustrates a case in which the extraction unit 30 has extracted nine character strings (Key1 to Key9) in step S100. FIG. 9 illustrates an example in which the association unit 42 has classified the representative character string candidates 32 including the character strings (Key1 to Key9) into character string groups $35_1$ to $35_4$. In the example illustrated in FIG. 9, Key1, Key3, and Key6 included in the character string group $35_1$ are similar to each other, Key2 and Key4 included in the character string group $35_2$ are similar to each other, another character string similar to Key5 included in the character string group $35_3$ does not exist, and Key7, Key8, and Key9 included in the character string group $35_4$ are similar to each other.

Next, in step S105, the association unit 42 selects one character string group from the character string groups ($35_1$ to $35_4$). Next, in step S107, the association unit 42 selects one character string included in the character string group selected in the above step S105. As one example, the association unit 42 of the present exemplary embodiment selects the character string ranked highest by posterior probability from among the character strings included in the character string group. In the example illustrated in FIG. 9, the association unit 42 selects Key1 from the character string group $35_1$, Key2 from the character string group $35_2$, Key 5 from the character string group $35_3$, and Key7 from the character string group $35_4$.

Next, in step S110, the association unit 42 adds the character strings selected in the above step S107 to the representative character strings 36.

Next, in step S113, the association unit 42 determines whether or not all character string groups have been selected in the above step S105. In the case in which there is a character string group that the association unit 42 has not selected yet, the determination of step S113 becomes a negative determination, the flow returns to step S105, and the process of step S107 and S110 is repeated. On the other hand, in the case in which the association unit 42 has selected all character string groups, the determination of step S113 becomes a positive determination, and the information processing ends.

Note that the present exemplary embodiment describes a configuration in which, when the association unit 42 selects one character string from a character string group, the association unit 42 selects the character string ranked highest by posterior probability in the character string group, but the configuration is not limited to the above. For example, the association unit 42 may also be configured to select the character string having the lowest similarity with the other character strings among the character strings included in the character string group.

Figure 10:
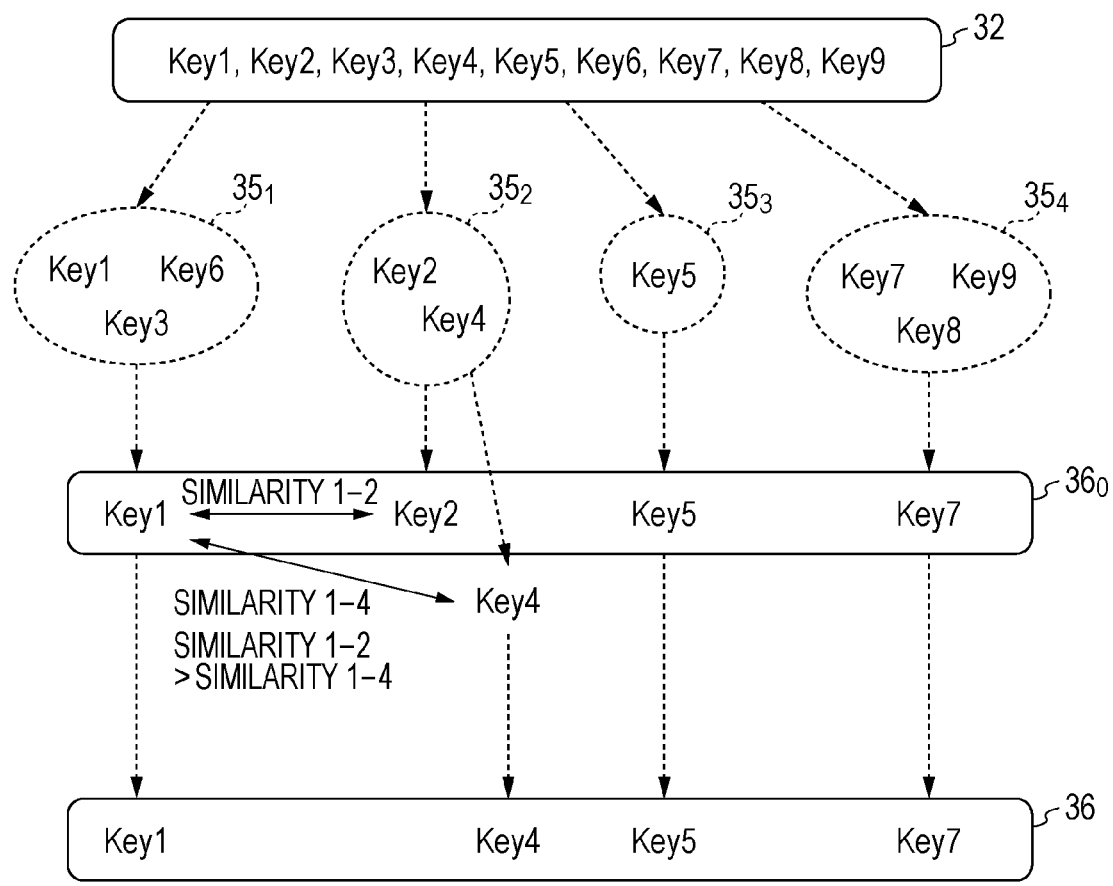
FIG. 10 is a diagram for explaining another example of a method of selecting a representative character string by the evaluation unit of the information processing device according to the second exemplary embodiment.
Figure 11:
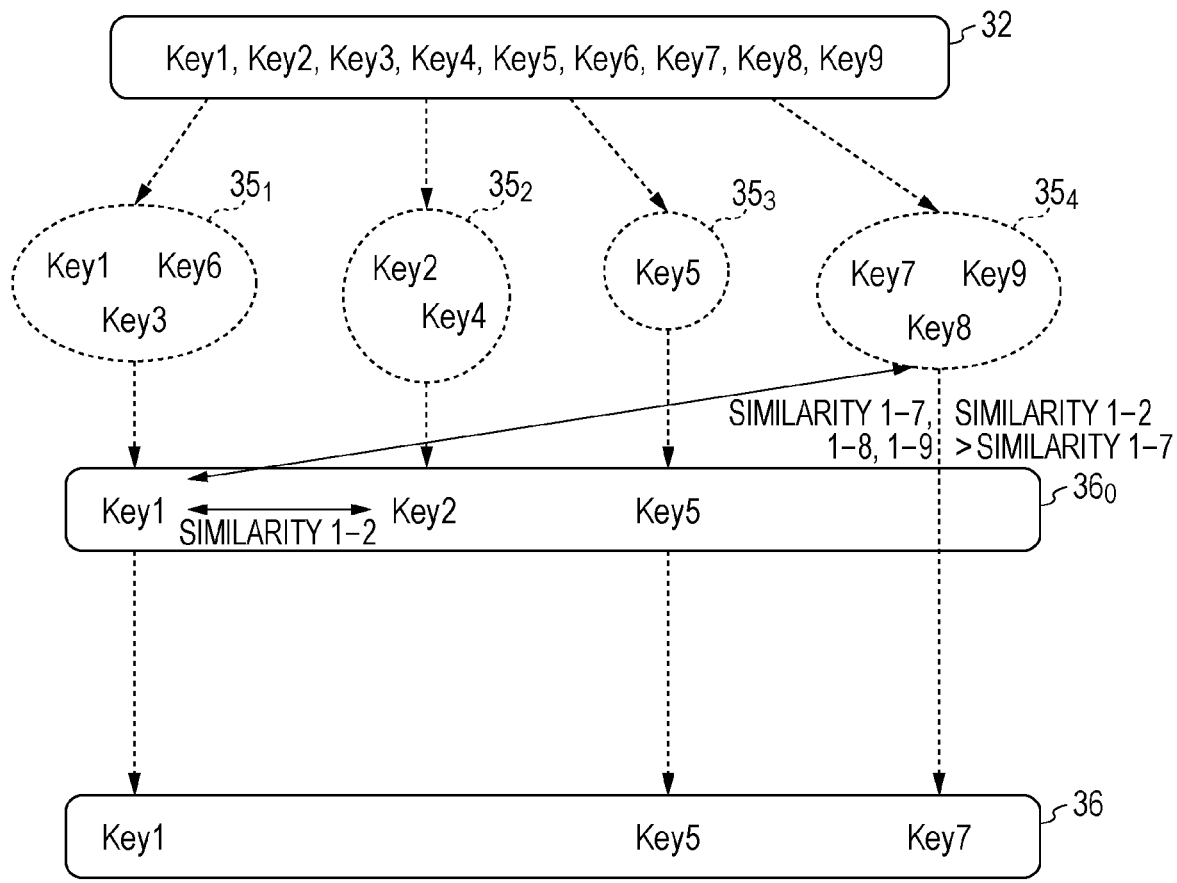
FIG. 11 is a diagram for explaining another example of a method of selecting a representative character string by the evaluation unit of the information processing device according to the second exemplary embodiment.

Also, like in the examples illustrated in FIGS. 10 and 11, in the case of high similarity between character strings included in the representative character strings $36_0$ selected by the association unit 42 according to the above information processing, the association unit 42 may replace one of the character strings with another character string of low similarity with the other character string, and after adding the replaced character string to the representative character strings 36, associate the representative character strings 36 with the electronic information 12.

For example, in the example illustrated in FIG. 10, the computation unit 40 computes a similarity (first similarity) between character strings included in representative character strings $36_0$. Furthermore, the computation unit 40 computes a similarity (second similarity) between character strings not included in the representative character strings $36_0$. Subsequently, the association unit 42 compares the first similarity and the second similarity. As a specific example, as illustrated in FIG. 10, the computation unit 40 computes a similarity 1-2 between the character string Key1 and the character string Key2, and also computes a similarity 1-4 between the character string Key1 and the character string Key4. Subsequently, the association unit 42 compares the similarity 1-2 and the similarity 1-4, and in the case of determining that the similarity 1-2 is higher, selects the character string Key4 instead of the character string Key2 as one of the representative character strings 36. In other words, since the character string Key4 is more dissimilar to the character string Key1 than the character string Key2, the character string Key4 is selected instead of the character string Key2 as one of the representative character strings 36. In this case, as illustrated in FIG. 10, the representative character strings 36 to be associated with the electronic information 12 include the character strings Key1, Key4, Key5, and Key7.

Also, for example, FIG. 11 illustrates a case in which the association unit 42 does not select a character string to act as a representative character string from the character string group $35_4$. The computation unit 40 computes a similarity (first similarity) between character strings included in the representative character strings $36_0$. Furthermore, the computation unit 40 also computes a similarity (second similarity) between character strings included in the character string group $35_4$. Subsequently, the association unit 42 compares the first similarity and the second similarity. As a specific example, as illustrated in FIG. 11, the computation unit 40 computes a similarity 1-2 between the character string Key1 and the character string Key2, also computes the similarity between the character string Key1 and each of the character strings Key7, Key8, and Key9, and compares these similarities to the similarity 1-2. Subsequently, in the case in which the association unit 42 determines that the similarity 1-2 is higher than the similarity with the character string Key7, namely the similarity 1-7, selects the character string Key7 instead of the character string Key2 as one of the representative character strings 36. In other words, since the character string Key7 is more dissimilar to the character string Key1 than the character string Key2, the character string Key7 is selected instead of the character string Key2 as one of the representative character strings 36. In this case, as illustrated in FIG. 11, the representative character strings 36 to be associated with the electronic information 12 include the character strings Key1, Key5, and Key7.

As described above, the information processing device 10 of the exemplary embodiments described above is provided with the computation unit 40 that computes the similarity between character strings in the representative character string candidates 32 that include multiple character strings expressing the content of the electronic information 12 generated from the electronic information 12, and the association unit 42 that, on the basis of the similarity, associates character strings not similar to other character strings among the multiple character strings with the electronic information 12 as representative character strings 36 expressing the electronic information 12.

Consequently, according to the information processing device 10 of the exemplary embodiments described above, it is possible to avoid applying character strings having similar meanings to the electronic information 12 compared to the case of not considering the similarity between multiple character strings generated from the electronic information 12.

Note that in the information processing device 10 of the exemplary embodiments described above, a configuration is described in which the electronic information 12 is information expressing a document, and character strings that act as key phrases are assigned to the electronic information 12, but the configuration is not limited to the above. For example, the information processing device 10 may also be configured to assign a summary expressing the content of the electronic information 12 to the electronic information 12. In the case of such a configuration, it is sufficient for the extraction unit 30 to extract multiple representative summary candidates from the electronic information 12, for the computation unit 40 of the evaluation unit 34 to compute the similarity between the extracted summary candidates, and for the association unit 42 to associate a summary selected on the basis of the similarity with the electronic information 12. Note that in the case in which the electronic information 12 is information expressing a document, since sentences and words that appropriately express the content of the electronic information 12 often are included at the beginning and the end of the document, the representative character string candidates 32 or the representative summary candidates preferably are extracted from sentences or character strings inside a range that includes at least one of the beginning and the end.

Figure 12:
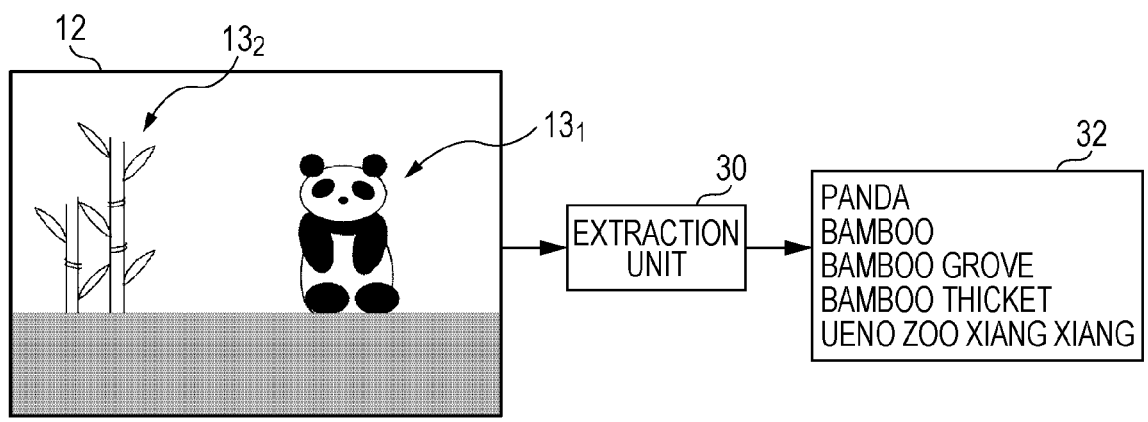
FIG. 12 is a diagram illustrating another example of electronic information and representative character string candidates extracted from the electronic information.

In addition, the electronic information 12 may also be information expressing at least one of a moving image and a still image, like the example illustrated in FIG. 12, for example. FIG. 12 illustrates a case in which the electronic information 12 is information expressing a still image, and illustrates a case in which the extraction unit 30 extracts the representative character string candidates 32 according to multiple target objects ($13_1$, $13_2$) or the like included in FIG. 12. In addition, the electronic information 12 may also be information combining information that expresses at least one of a moving image and a still image, and information that expresses a document.

Additionally, the various processes executed by having the CPU 20 execute software (programs) in the foregoing exemplary embodiments may also be executed by any of various types of processors other than the CPU 20. Examples of the processor in such a case include a programmable logic device (PLD) whose circuit configuration is modifiable after fabrication, such as a field-programmable gate array (FPGA), a dedicated electric circuit which is a processor including a circuit configuration designed for the specific purpose of executing a specific process, such as an application-specific integrated circuit (ASIC), and the like. Also, the various processes described above may be executed by one of these various types of processors, or may be executed by a combination of two or more processors of the same or different types (such as multiple FPGAs, or a combination of a CPU and an FPGA, for example). Also, the hardware structure of these various types of processors is more specifically an electric circuit combining circuit elements such as semiconductor devices.

Also, in the foregoing exemplary embodiments, a mode is described in which the information processing program 28 is stored in advance (preinstalled) in the storage 22, but the configuration is not limited to the above. The information processing program 28 may also be provided by being recorded onto a recording medium such as a Compact Disc-Read-Only Memory (CD-ROM), a Digital Versatile Disc-Read-Only Memory (DVD-ROM), or Universal Serial Bus (USB) memory. In addition, the information processing program 28 may also be downloaded from an external device over a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
   a computation unit that computes a similarity between a plurality of character strings extracted from electronic information as an evaluation value, wherein the character strings express a content shown in the electronic information; and
   an association unit that associates a dissimilar character string in the electronic information that is not similar to another character string in the electronic information among the plurality of character strings on the basis of the evaluation value within the electronic information as a representative character string that expresses the electronic information,
   wherein after treating character strings with a high certainty of expressing the content of the electronic information from among the plurality of character strings as representative character strings expressing the content of the electronic information, if mutually similar character strings exist among the representative character strings, the association unit excludes one of the mutually similar character strings from the representative character strings;
   wherein after excluding one of the character strings from the representative character strings, the association unit newly adds a character string of low similarity to a character string included in the representative character strings as a representative character string.

2. The information processing device according to claim 1, wherein
   the association unit excludes, from the representative character strings, character strings with a low certainty of expressing the content of the electronic information among the mutually similar character strings.

3. The information processing device according to claim 2, wherein
   the character strings excluded from the representative character strings by the association unit are all character strings other than a character string with the highest certainty of expressing the content of the electronic information.

4. The information processing device according to claim 1, wherein
   the association unit adds a character string with the highest certainty of expressing the content of the electronic information to the representative character strings from among the plurality of character strings other than the representative character strings selected from the plurality of character strings.

5. The information processing device according to claim 4, wherein
   in a case in which the character string with the highest certainty is similar to a representative character string, the association unit adds, to the representative character strings, the character string with the next-highest certainty among the character strings other than the representative character strings instead of the character string with the highest certainty.

6. The information processing device according to claim 1, wherein
   in a case of excluding a subset of the character strings from among the representative character strings selected from the plurality of character strings, the association unit adds a same number of character strings as the excluded character strings to the representative character strings from the character strings other than the representative character strings.

7. The information processing device according to claim 1, wherein
   the association unit generates a plurality of character string groups including mutually similar character strings, and associates one character string selected from each of one or more character string groups included in the plurality of character string groups with the electronic information as the representative character strings.

8. The information processing device according to claim 7, wherein
   the association unit selects the character string with the highest certainty of expressing the content of the electronic information from among the character strings included in each character string group.

9. The information processing device according to claim 8, wherein
   the computation unit computes a first similarity that is the similarity between character strings selected from each character string group, and a second similarity that is the similarity between a selected character string and another character string included in a character string group that does not include the selected character string.

10. The information processing device according to claim 9, wherein
    in a case in which the character strings selected from each character string group are more similar on a basis of the first similarity and the second similarity, the association unit associates the other character string indicating the second similarity that is lower than the first similarity with the electronic information as a representative character string.

11. The information processing device according to claim 10, wherein
    the association unit associates only the other character string from among the character strings included in the character string group that includes the other character string with the electronic information.

12. The information processing device according to claim 1, wherein
    the electronic information is at least one of information expressing a still image or a moving image including a plurality of scenes, and information expressing a document including a plurality of scenes.

13. The information processing device according to claim 12, wherein the electronic information is information expressing a moving image or a still image including a plurality of target objects.

14. The information processing device according to claim 1, wherein
in a case in which similar character strings exist among a character string group with a highest certainty of expressing the content of the electronic information, the certainty of one of the character strings is lowered below the certainty assigned to a character string not included in the character string group.

15. The information processing device according to claim 1, wherein
when computing the similarity, the computation unit computes the similarity that also includes information related to a certainty of expressing the content of the electronic information.

16. A non-transitory computer readable recording medium storing a program causing a computer to execute a process for processing information, the process comprising:
computing a similarity between a plurality of character strings extracted from electronic information as an evaluation value, wherein the character strings express a content shown in the electronic information; and
associating a dissimilar character string in the electronic information that is not similar to another character string in the electronic information among the plurality of character strings on the basis of the evaluation value within the electronic information as a representative character string that expresses the electronic information,
wherein after treating character strings with a high certainty of expressing the content of the electronic information from among the plurality of character strings as representative character strings expressing the content of the electronic information, if mutually similar character strings exist among the representative character strings, excluding one of the mutually similar character strings from the representative character strings;
wherein after excluding one of the character strings from the representative character strings, the association unit newly adds a character string of low similarity to a character string included in the representative character strings as a representative character string.

* * * * *